(12) United States Patent
Sumiyashiki

(10) Patent No.: US 7,621,478 B2
(45) Date of Patent: Nov. 24, 2009

(54) WEBBING RETRACTOR DEVICE

(75) Inventor: Akira Sumiyashiki, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 107 days.

(21) Appl. No.: 11/854,460

(22) Filed: Sep. 12, 2007

(65) Prior Publication Data

US 2008/0067275 A1    Mar. 20, 2008

(30) Foreign Application Priority Data

Sep. 19, 2006    (JP) .............................. 2006-252543

(51) Int. Cl.
    *B60R 22/38*    (2006.01)
(52) U.S. Cl. .................... 242/383; 242/383.1
(58) Field of Classification Search ................. 242/383, 242/383.1, 383.3, 379.1
    See application file for complete search history.

(56) References Cited

U.S. PATENT DOCUMENTS 6,305,633 B1    10/2001    Asagiri et al.
6,318,664 B1 *  11/2001    Sumiyashiki ................ 242/379
6,352,213 B1 *  3/2002     Sumiyashiki et al. ..... 242/383.2
6,902,129 B2    6/2005     Grasser et al.

FOREIGN PATENT DOCUMENTS

EP    1 388 468 A1    2/2004
GB    2 288 526 A     10/1995
JP    5-246303 A      9/1993

* cited by examiner

*Primary Examiner*—Sang Kim
(74) *Attorney, Agent, or Firm*—Roberts Mlotkowski Safran & Cole, P.C.; Thomas W. Cole

(57) ABSTRACT

When a spool rotates in a retraction direction, a guide pin of a lock member presses against an inner wall of a groove portion with a pressing force in the same direction as a centrifugal force. As a result, friction between an outer circumferential portion of the guide pin and the inner wall of the groove portion increases, a V-gear is held by the guide pin, and rotation of the V-gear in the retraction direction relative to the spool is suppressed. Further, the V-gear, which is pressed by a pressing force at the inner wall of the groove portion, presses against a shaft portion of a torsion shaft with a pressing force in the same direction as the above-described pressing force when the V-gear attempts to move in the direction of action of the above-described pressing force. Accordingly, friction between an inner circumferential portion of the V-gear and an outer circumferential portion of the shaft portion increases and, as a result, rotation of the V-gear in the retraction direction relative to the spool is suppressed.

4 Claims, 6 Drawing Sheets

WEBBING RETRACTOR DEVICE

CROSS-REFERENCE TO RELATED APPLICATIONS

This application is based on and claims priority under 35 USC 119 from Japanese Patent Application No. 2006-252543 filed on Sep. 19, 2006.

BACKGROUND

1. Field of the Invention

The present invention relates to a webbing retractor device that retracts and accommodates a webbing belt for restraining a passenger seated in a seat.

2. Description of the Related Art

As disclosed, for example, in Japanese Patent Application Laid-Open (JP-A) No. 5-246303, a webbing retractor device constituting a part of a vehicle seat belt device is provided with a lock mechanism that restricts rotation of a reel shaft toward a pull-out direction at a time of rapid vehicle deceleration. A lock gear constituting a part of the lock mechanism disclosed in JP-A No. 5-246303 is able to rotate coaxially relative to the reel shaft, and when the reel shaft rotates in a pull-out direction relative to the lock gear, teeth of a main pawl and a back-up pawl respectively engage with an internal tooth formed at either side wall of a frame in conjunction with the relative rotation, restricting rotation of the reel shaft in the pull-out direction. There are two types of structure that allow the occurrence of relative rotation between the reel shaft and the lock gear, the first being a deceleration detection portion. The deceleration detection portion is provided with an inertial body that exhibits inertial movement at a time of rapid vehicle deceleration, and rotation of the lock gear is restricted by engagement of an engagement claw, which is pushed upward by the inertial movement of the inertial body, with an external tooth of the lock gear, and the lock gear rotates relative to the reel shaft, which rotates in the pull-out direction.

Further, the other structure that allows relative rotation between the reel shaft and the lock gear is an inertial body provided at the lock gear which is separate to the inertial body of the deceleration detection portion. This inertial body is connected to the lock gear by a spring, and when the lock gear rotates rapidly in the pull-out direction together with the reel shaft, the inertial body resists the biasing force of the spring due to inertia and delayed rotation occurs with respect to the lock gear. Along with relative rotation with respect to the lock gear due to the delayed rotation, the inertial body moves toward an outer side in a radial direction of the rotation of the lock gear and engages with a ratchet tooth which is an internal tooth formed at an inner side of a cover, and rotation of the inertial body and, consequently, of the lock gear, is terminated. By terminating the rotation of the lock gear in this manner, the lock gear rotates relative to the reel shaft which rotates in the pull-out direction.

However, when the lock mechanism operates inadvertently immediately after retraction of the webbing belt by the reel shaft has finished, "end-lock" occurs, whereby the reel shaft cannot rotate in the pull-out direction from this state. In a state of end-lock, it is difficult to extract of the webbing belt because the reel shaft cannot rotate in the pull-out direction. Accordingly, in the above JP-A No. 5-246303, a state of end-lock is prevented by a structure whereby the engagement claw of the deceleration detection portion and the external tooth of the lock gear do not engage when retraction of the webbing belt is complete.

However, when the spool sharply rotates slightly in the pull-out direction due to a reverse action immediately after retraction of the webbing belt is complete, there are cases when the inertial body provided at the lock gear engages with the ratchet tooth formed at the cover and when, in this state, the spool is rotated in the pull-out direction in order to extract the webbing belt, the lock mechanism operates and a state of end-lock occurs.

SUMMARY OF THE INVENTION

In consideration of the above situation, the present invention aims to achieve a webbing retractor device that can prevent the occurrence of a state of end-lock when the spool rotates in the pull-out direction due to a reverse action immediately after retraction of the webbing belt is complete.

A webbing retractor device according to a first aspect of the present invention is provided with: a spool that winds up a long belt-shaped webbing belt from an anchor end side thereof by rotating around its own axis in one direction, which is a retraction direction; a rotating body that is axially supported at the spool so as to be able to rotate in conjunction with the rotation of the spool, in a state in which it is relatively rotatable to a predetermined angle with respect to the spool; a lock portion that locks the spool and restricts rotation of the spool when the spool rotates relative to the rotating body in a pull-out direction opposite to the retraction direction; and a holding portion that holds the rotating body due to a centrifugal force of the spool rotating in the retraction direction.

According to the webbing retractor device of the first aspect of the present invention, when the spool begins to rotate toward the pull-out direction at more than a predetermined rate of acceleration, and rotation of the rotating body which attempts to rotate in conjunction therewith is restricted, rotation of the rotating body relative to the spool occurs. In a state in which the rotating body is stopped with respect to the rotation of the spool in the pull-out direction, that is, when the rotating body rotates in the retraction direction relative to the spool, the lock portion operates and, as a result, the spool is locked and rotation of the spool in the pull-out direction is restricted.

Further, when the spool rotates in the retraction direction, the holding portion holds the rotating body due to a centrifugal force generated by the rotation of the spool. Since the rotating body rotates in the retraction direction in conjunction with the spool when the spool is rotating in the retraction direction, the rotating body attempts to rotate in the retraction direction due to inertia even when retraction of the webbing belt by the spool is finished and the spool suddenly stops. However, since the rotating body is held by the holding portion until the spool stops, rotation of the rotating body in the retraction direction immediately after the spool suddenly stops is either prevented or effectively suppressed.

In this way, by preventing or effectively suppressing relative rotation whereby the rotating body rotates in the retraction direction with respect to the spool which is in a stopped state, operation of the lock portion after retraction of the webbing belt by the spool has finished, that is, the occurrence of "end-lock", can be prevented or effectively suppressed.

In addition, while the configuration of the present invention is such that the rotating body is axially supported at the spool, a configuration where the rotating body is indirectly axially supported at the spool, such as a configuration where the rotating body is axially supported by a shaft member or the like connected integrally to the spool, may be adopted instead of a configuration where the rotating body is directly axially supported at the spool.

A webbing retractor device according to a second aspect of the present invention is characterized in that, in the first aspect of the present invention, the holding portion presses against the rotating body and holds the rotating body by receiving the centrifugal force.

According to the webbing retractor device of the second aspect of the present invention, the holding portion presses against the rotating body due to the centrifugal force generated by the rotation of the spool when the spool rotates in the retraction direction and, as a result, the rotating body is held. Accordingly, rotation of the rotating body in the retraction direction immediately after the spool suddenly stops is either prevented or effectively suppressed.

A webbing retractor device according to a third aspect of the present invention is characterized in that, in the second aspect of the present invention, the lock portion and the holding portion comprise a lock member that is provided at the spool in a state of engagement with the rotating body, that locks the spool by displacing in a different direction to the direction of rotation of the spool in conjunction with rotation of the spool in the pull-out direction relative to the rotating body, and that presses the rotating body toward an outer direction in a radial direction of the rotation of the spool due to the centrifugal force, and holds the rotating body.

In the webbing retractor device of the third aspect of the present invention, the lock member structuring both the lock portion and the holding portion is provided at the spool and rotates together with the spool. Further, the lock member is engaged with the rotating body and, accordingly, when the spool rotates in the pull-out direction relative to the rotating body, rotation of the lock member in conjunction with the spool is restricted by the rotating body such that the lock member is displaced in a different direction to the direction of rotation of the spool in conjunction with the rotation of the spool relative to the rotating body described above, whereby the spool is locked and rotation of the spool in the pull-out direction is restricted.

Further, when the lock member provided at the spool rotates in the retraction direction together with the spool when the spool rotates in the retraction direction, the lock member, which is engaged with the rotating body, presses against the rotating body due to a centrifugal force and the rotating body is held by the pressing force of the lock member. Accordingly, since the rotating body is held by the pressing force from the lock member until the spool stops when the spool rotates in the retraction direction, rotation of the rotating body in the retraction direction immediately after the spool suddenly stops is prevented or effectively suppressed.

A webbing retractor device according to a fourth aspect of the present invention is characterized in that, in the third aspect of the present invention, a pressure receiving portion is provided such that the lock member is contactable with the rotating body, and the pressure receiving portion receives a pressing force, derived from the centrifugal force, from the lock member at a region of contact with the lock member, wherein the region of contact faces an inner direction in a radial direction of the rotation of the spool or a direction inclined toward the retraction direction with respect to the inner direction in a radial direction of the rotation of the spool.

In the webbing retractor device of the fourth aspect of the present invention, the lock member presses against a pressure receiving portion provided at the rotating body due to the centrifugal force when the spool rotates in the retraction direction. As a result, the rotating body is held. Here, a region of contact at which the lock member contacts the pressure receiving portion (that is, a region that receives the pressing force) faces an inner direction in a radial direction of the rotation of the spool or a direction inclined toward the retraction direction with respect to the inner direction in a radial direction of the rotation of the spool.

Since the lock member presses against the pressure receiving portion due to the centrifugal force, the direction of the pressing force that the lock member imparts to the pressure receiving portion is the same as the direction of the centrifugal force, which is an outer direction in the radial direction of the rotation of the spool. Consequently, in a configuration where the contact region at which the lock member contacts the pressure receiving portion faces the inner direction in a radial direction of the rotation of the spool, the direction of action of the pressing force does not incline toward a circumferential direction of the rotation of the spool with respect to the radial direction of the rotation of the spool (in other words, a direction tangential to the rotation of the spool at the contact region of the lock member at the pressure receiving portion) when the pressure receiving portion receives the pressing force from the lock member.

Further, in a configuration where the contact region at which the lock member contacts the pressure receiving portion faces a direction inclined toward the retraction direction with respect to the inner direction in a radial direction of the rotation of the spool, the pressing force acts in a direction inclined toward the pull-out direction with respect to the outer direction in a radial direction of the rotation of the spool (in other words, a direction inclined toward the pull-out direction side of the directions tangential to the rotation of the spool at the contact region of the lock member at the pressure receiving portion) when the pressure receiving portion receives the pressing force from the lock member.

That is to say, in the fourth aspect of the present invention, the direction of action of the pressing force does not incline toward the retraction direction with respect to the outer direction in the radial direction of the rotation of the spool when the pressure receiving portion receives, from the lock member, a pressing force directed toward the outer direction in the radial direction of the rotation of the spool. Consequently, when the spool rotates in the retraction direction, rotation of the rotating body in the retraction direction relative to the spool is prevented or effectively suppressed, and from this state, rotation of the rotating body in the retraction direction when the spool suddenly stops is prevented or effectively suppressed.

A webbing retractor device according to a fifth aspect of the present invention is characterized in that the fourth aspect of the present invention is provided with: a projection formed to project from a main body portion of the lock member toward the rotating body; and a guide portion formed at the rotating body so as to allow insertion of the projection thereinside, an inner wall of which guides the projection when the spool rotates in the pull-out direction relative to the rotating body, and which causes the lock member to be displaced in a direction of locking of the spool, wherein: the pressure receiving portion is formed at the rotating body so as to allow insertion of the projection thereinside; the pressure receiving portion is consecutive with the guide portion so as to allow reciprocal movement of the projection between the pressure receiving portion and the guide portion; and an inner wall of the pressure receiving portion, which receives a pressing force, derived from the centrifugal force, from the projection, faces an inner direction in a radial direction of the rotation of the spool or a direction inclined toward the retraction direction with respect to the inner direction in a radial direction of the rotation of the spool.

In the webbing retractor device according to the fifth aspect of the present invention, when the spool rotates in the pull-out direction in a state in which rotation of the rotating body in the pull-out direction is restricted, the projection formed at the lock member moves from the pressure receiving portion toward the guide portion and, in addition, the projection and, consequently, the lock member, are guided along the inner wall of the guide portion and move toward a direction of locking of the spool.

Further, when the spool rotates in the retraction direction, the lock member attempts to move toward an outer direction in a radial direction of the rotation of the spool due to the centrifugal force and, as a result, the projection of the lock member, which is positioned inside the pressure receiving portion, presses against the inner wall of the pressure receiving portion.

Here, in the webbing retractor device according to the present invention, the inner wall of the pressure receiving portion faces an inner direction in a radial direction of the rotation of the spool or a direction inclined toward the retraction direction with respect to the inner direction in a radial direction of the rotation of the spool. Consequently, in a configuration where the inner wall contacted by the projection faces an inner direction in a radial direction of the rotation of the spool, the direction of action of the pressing force does not incline toward a circumferential direction of the rotation of the spool with respect to the radial direction of the rotation of the spool (in other words, a direction tangential to the rotation of the spool at the inner wall contacted by the projection) when the inner wall receives the pressing force from the projection.

Further, in a configuration where the inner wall contacted by the projection faces a direction inclined toward the retraction direction with respect to the inner direction in a radial direction of the rotation of the spool, the pressing force acts in a direction inclined toward the pull-out direction with respect to the outer direction in a radial direction of the rotation of the spool (in other words, a direction inclined toward the pull-out direction side of the directions tangential to the rotation of the spool at the inner wall contacted by the projection) when the inner wall receives the pressing force from the projection.

That is to say, in the fifth aspect of the present invention, the direction of action of the pressing force does not incline toward the retraction direction with respect to the outer direction in the radial direction of the rotation of the spool when the inner wall of the pressure receiving portion receives, from the projection of the lock member, a pressing force inclined in the outer direction in the radial direction of the rotation of the spool. Consequently, when the spool rotates in the retraction direction, rotation of the rotating body in the retraction direction relative to the spool is prevented or effectively suppressed, and from this state, rotation of the rotating body in the retraction direction when the spool suddenly stops is prevented or effectively suppressed.

As explained in the foregoing, in the webbing retractor device according to the present invention, the occurrence of end-lock when the spool rotates in the pull-out direction due to a reverse action immediately after retraction of the webbing belt is finished, can be prevented.

BRIEF DESCRIPTION OF THE DRAWINGS

Exemplary embodiments of the present invention will be described in detail based on the following figures, wherein.

DETAILED DESCRIPTION OF THE INVENTION

Configuration of the First Embodiment

Figure 1:
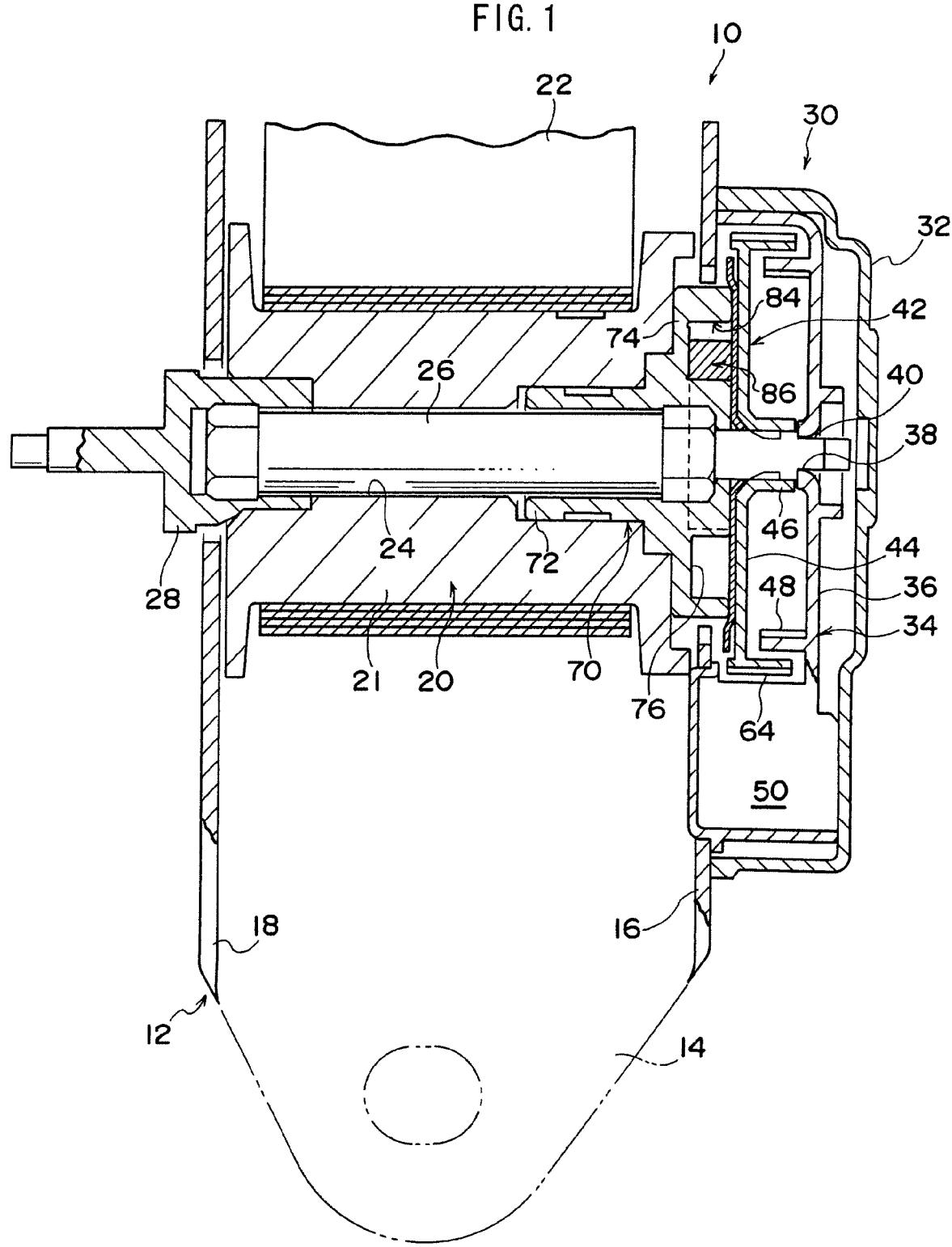
FIG. 1 is a front face sectional view showing the overall structure of a webbing retractor device according to a first embodiment of the present invention.

The configuration of webbing retractor device 10 according to a first embodiment of the present invention is shown in front face sectional view in FIG. 1. As shown in this drawing, webbing retractor device 10 is provided with frame 12. Frame 12 is provided with flat plate-shaped back plate 14 which is fixed to the vehicle body of a vehicle by a fastener such as a bolt. Back plate 14 is aligned in a width direction with a front-rear direction of the vehicle, and flat plate-shaped arm plates 16 and 18 are provided so as to extend in one direction in a thickness direction of back plate 14, from either end portion in a width direction of back plate 14.

Main body 21 of spool 20 is disposed between arm plate 16 and arm plate 18. The axial direction of main body 21 is aligned with the direction in which arm plate 16 and arm plate 18 are opposed, and main body 21 is freely rotatable around this axis in one direction which is a retraction direction and the opposite direction thereto which is a pull-out direction. The anchor end side in a length direction of long belt-shaped webbing belt 22 is locked at main body 21, and when main body 21 is rotated in the retraction direction, webbing belt 22 is wound up and stored at main body 21 from the anchor end side in a length direction.

Through-hole 24 is formed at the axial center of main body 21 and penetrates in the axial direction of main body 21. Torsion shaft 26 is disposed at through hole 24. Adaptor 28 is mounted at the end portion of torsion shaft 26 at the side of arm plate 18, substantially integrally with torsion shaft 26. Adaptor 28 is fixed by insertion from the arm plate 18 side of through-hole 24 in a non-turning state with respect to main body 21 and, consequently, main body 21 and torsion shaft 26 are mechanically connected, and main body 21 and torsion shaft 26 rotate essentially integrally.

Adaptor 28 is directly or indirectly connected to the inner side end in a direction of the spiral of a flat spiral spring (not shown). The outer side end in a direction of the spiral of the flat spiral spring is fixed at a spring case (not shown) that is directly or indirectly attached to arm plate 18, and the flat spiral spring is configured such that it is wound up when main body 21 is rotated in the pull-out direction and urges main body in the retraction direction.

Further, the present webbing retractor device 10 is provided with lock mechanism 30. Lock mechanism 30 is provided with sensor cover 32 which is disposed at the opposite side of arm plate 16 to arm plate 18. Sensor cover 32 is formed in a concave shape that opens toward the side of arm plate 18, and is directly or indirectly attached to arm plate 16. Sensor holder 34 is provided at the inner side of sensor cover 32. Sensor holder 34 is provided with bottom wall 36 that is parallel to arm plate 16. Shaft bearing hole 38 is formed at bottom wall 36, and shaft portion 40, which is formed protruding from the end portion of torsion shaft 26 at the side of arm plate 16, is pivotally supported thereat so as to be freely rotatable.

V-gear 42 is provided, as a rotating body, closer to arm plate 16 than bottom wall 36 of sensor holder 34. V-gear 42 is provided with circular plate-shaped main body 44. A through-hole is formed at the center of main body 44. In addition, cylindrically-shaped boss 46 is formed at the surface of main body 44 at the side of bottom wall 36, coaxially with the through-hole formed at the center of main body 44. Shaft portion 40 passes through the through-hole and boss 46, and V-gear 42 is supported so as to be freely rotatable coaxially with shaft portion 40 (in other words, with torsion shaft 26 and, therefore, with main body 21).

A pawl (not shown) is supported at the bottom wall 36 side of main body 44 so as to be able to swing freely around an axis parallel to shaft portion 40. Ratchet tooth 48, which is an internal tooth, is formed at the main body 44 side of sensor holder 34 so as to correspond to the pawl. The pawl provided at main body 44 is urged toward a side in the pull-out direction with respect to V-gear 42 around an axis parallel to shaft portion 40 due to the biasing force of a biasing member such as a compression coil spring or a torsion coil spring; however, when the pawl swings in the retraction direction with respect to V-gear 42 in resistance to the biasing force, the leading end of the pawl engages with ratchet tooth 48. In a state in which the pawl is thus engaged with ratchet tooth 48, rotation of V-gear 42 toward the pull-out direction is restricted.

Further, sensor housing portion 50 is formed at sensor holder 34 below main body 44. An acceleration sensor (not shown) is housed at sensor housing portion 50. The acceleration sensor is activated when a state of sudden rapid deceleration of a vehicle is sensed, and when activated, an engagement portion that is a component of the acceleration sensor engages with ratchet tooth 64. As a result, a structure is achieved whereby rotation of V-gear 42 in toward the pull-out direction is restricted.

Further, as shown in FIG. 1, lock base 70 is provided closer to arm plate 18 than V-gear 42. Lock base 70 is provided with cylindrically-shaped insertion fitting portion 72. Insertion fitting portion 72 is fitted by insertion into through-hole 24 coaxially with respect to main body 21 from the end portion of main body 21 at the arm plate 16 side. Further, lock base 70 is provided with main body portion 74. Main body portion 74 is formed continuously from the end portion of insertion fitting portion 72 at the arm plate 16 side. Torsion shaft 26 is coaxially and integrally fitted into the inside of lock base 70, formed from insertion fitting portion 72 and main body portion 74, from the end portion of lock base 70 at the opposite side of insertion fitting portion 72 to main body portion 74.

Since, as described above, insertion fitting portion 72 is cylindrically shaped, it is relatively rotatable coaxially with respect to main body 21; however, since torsion shaft 26 is connected to lock base 70, lock base 70 is integrally connected to main body 21 via torsion shaft 26, such that lock base 70 essentially rotates integrally with main body 21.

Figure 2:
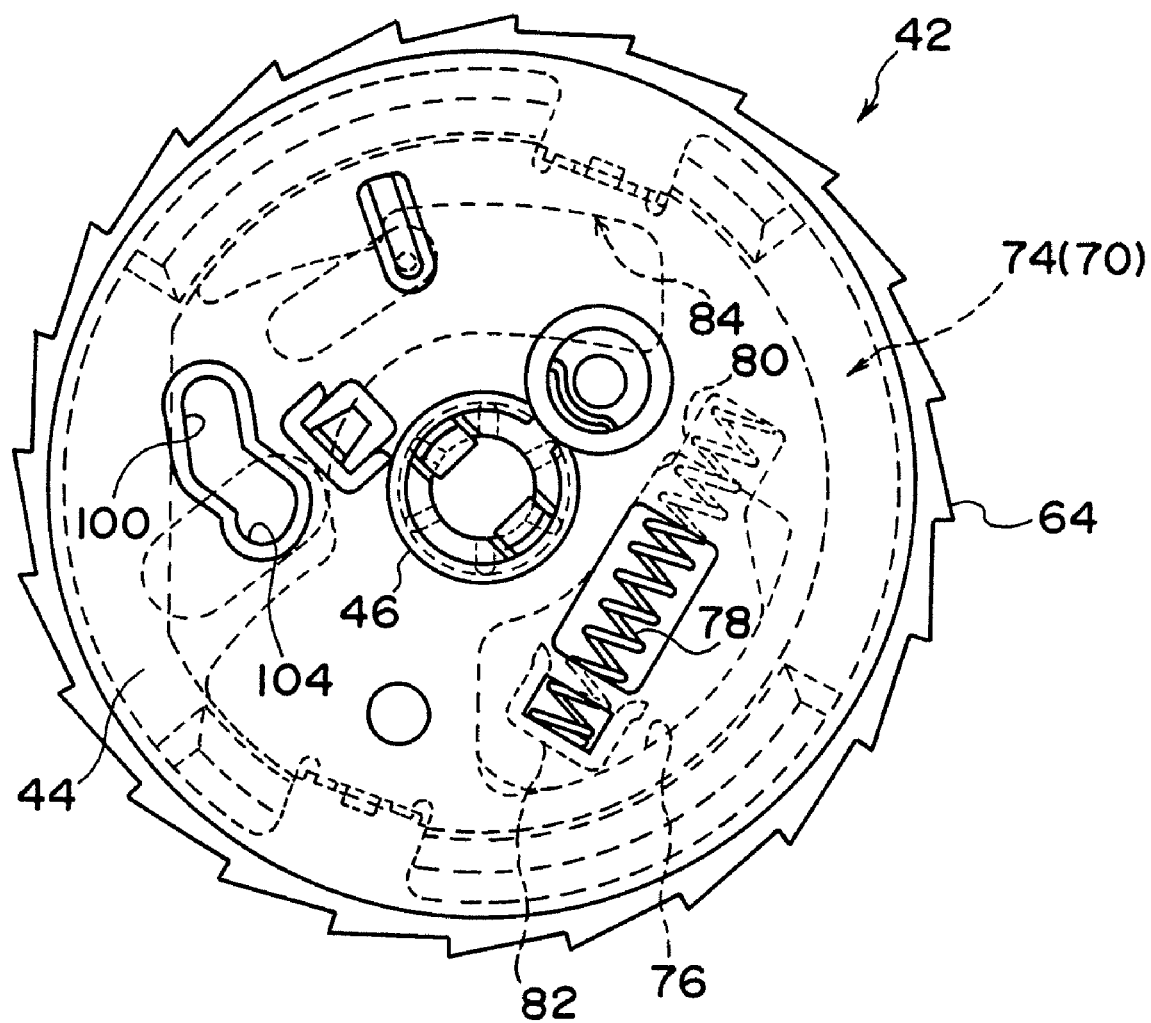
FIG. 2 is a front face view showing the structure of a rotating body.

Further, spring housing portion 76 is formed at main body portion 74 of lock base 70. As shown in FIG. 2, spring housing portion 76 is formed at a position displaced toward an outer side in a radial direction from the center of main body portion 74 and, in addition, is open at an end portion at an opposite side of main body portion 74 to insertion fitting portion 72, and compression coil spring 78 is housed inside thereof as shown in FIG. 2 (not shown in FIGS. 3 and 4). One end of compression coil spring 78 contacts inner wall 80 at a side of spring housing portion 76 in the retraction direction. Further, at the other end side of compression coil spring 78, wall portion 82 formed at an end surface at the lock base 70 side of main body 44 (V-gear 42) enters inside of spring housing portion 76 and the other end portion of compression coil spring 78 contacts wall portion 82.

As described above, V-gear 42 is axially supported at shaft portion 40 so as to be freely rotatable; however, since the other end of compression coil spring 78, which has one end contacting inner wall 80, contacts wall portion 82, V-gear 42 rotates in the pull-out direction when lock base 70 rotates in the pull-out direction because compression coil spring 78, which is pressed by inner wall 80, also presses against wall portion 82.

Figure 3:
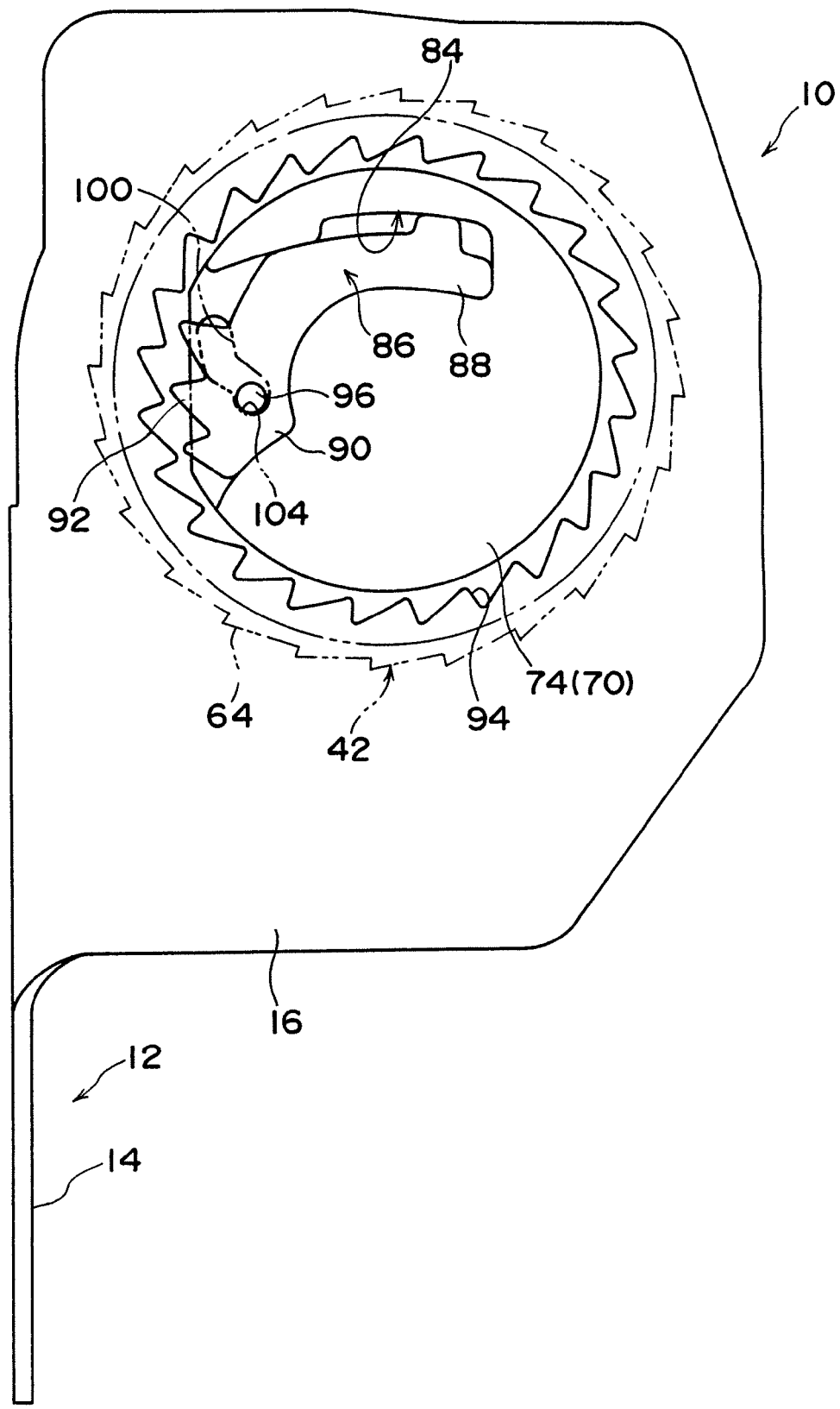
FIG. 3 is a diagram showing an initial state in which a lock member is inserted inside a groove portion.
Figure 4:
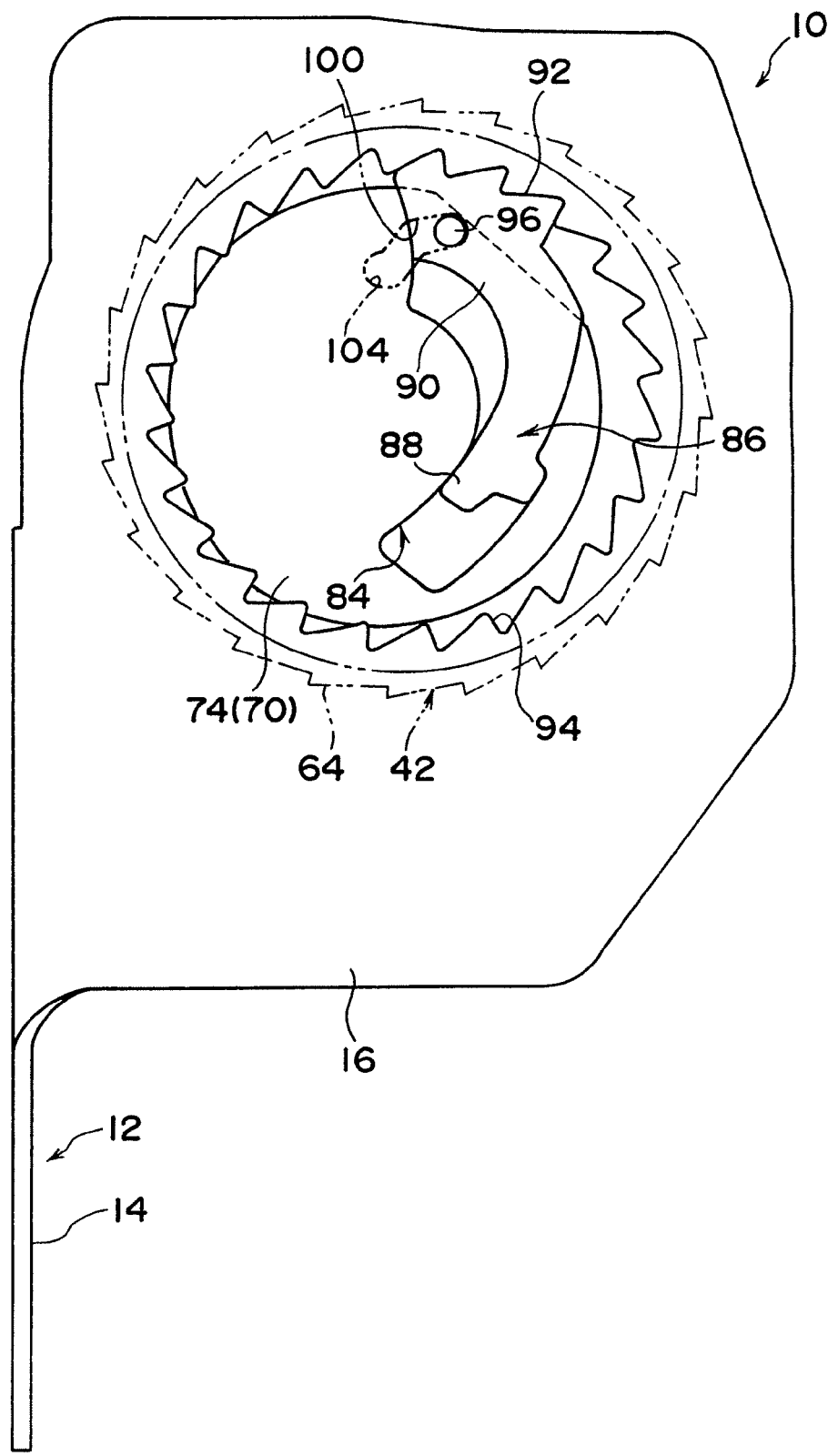
FIG. 4 is a diagram corresponding to FIG. 3, and showing a state in which the lock member has moved as far as a position at which the spool can be locked.

Further, as shown in FIG. 1, plate housing portion 84 is formed at main body portion 74. As shown in FIG. 2, plate housing portion 84 is formed at a position displaced at an outer side in a radial direction from the center of main body portion 74 and, in addition, is open at an end portion at an opposite side of main body portion 74 to insertion fitting portion 72 and lock plate 86 is housed inside thereof as a lock member. As shown in FIGS. 3 and 4, lock plate 86 is provided with base portion 88.

Base portion 88 is formed in a flat plate shape having a longitudinal direction generally aligned along the circumferential direction of main body portion 74 and a width direction aligned with the radial direction of main body portion 74. Lock portion 90 is formed continuously from an end portion at a side in the retraction direction along the longitudinal direction of base portion 88. An outer peripheral portion of main body portion 74 is open so as to correspond to lock portion 90, and when lock plate 86 moves toward a side in the retraction direction along an inner side of plate housing portion 84, lock portion 90 of lock plate 86 is configured to protrude beyond an outer side of an outer circumferential portion of main body portion 74.

Ratchet teeth 92 are formed at an outer circumferential portion of lock portion 90. Ratchet teeth 94, which are internal teeth, are formed at arm plate 16 so as to correspond to ratchet teeth 92, and when lock portion 90 protrudes beyond the outer side of the outer circumferential portion of main body portion 74, ratchet teeth 92 can engage with ratchet teeth 94. This configuration results in rotation of ratchet teeth 92 toward the side of the pull-out direction being restricted by engagement of ratchet teeth 92 with ratchet teeth 94, and in rotation of main body 21 in the pull-out direction being restricted by the restriction of the rotation of ratchet teeth 92 toward the side of the pull-out direction.

Further, as shown in FIGS. 3 and 4, guide pin 96 is formed as a projection that protrudes from lock portion 90 toward the main body 44 side of V-gear 42. Guide groove 100 is formed as a guide portion at main body 44 so as to correspond to guide pin 96 and is bent between one and the other end in a longitudinal direction in a substantial V-shape around an axis parallel with respect to the axial direction of main body 21. Guide pin 96 penetrates inside of guide groove 100. The direction of one of the mutually opposing inner walls in an inner width direction of guide groove 100, in other words, the inner width direction of guide groove 100, is designed such that when the one inner wall of guide groove 100 receives a rotating force from guide pin 96 prompting rotation in the pull-out direction, the direction of the reaction force imparted to guide pin 96 from the one inner wall of guide groove 100 is toward an outer side in a radial direction of V-gear 42.

When guide pin 96 moves from one end toward the other end in a longitudinal direction of guide groove 100 due to the reaction force from the one inner wall of guide groove 100, lock plate 86 moves such that lock member 90 projects beyond the outer side of the outer circumferential portion of main body portion 74 and, in addition, as shown in FIG. 4, when lock plate 86 moves to the extent that guide pin 96 reaches the other end portion in a longitudinal direction of guide groove 100, ratchet teeth 92 engage with ratchet teeth 94.

Figure 5:
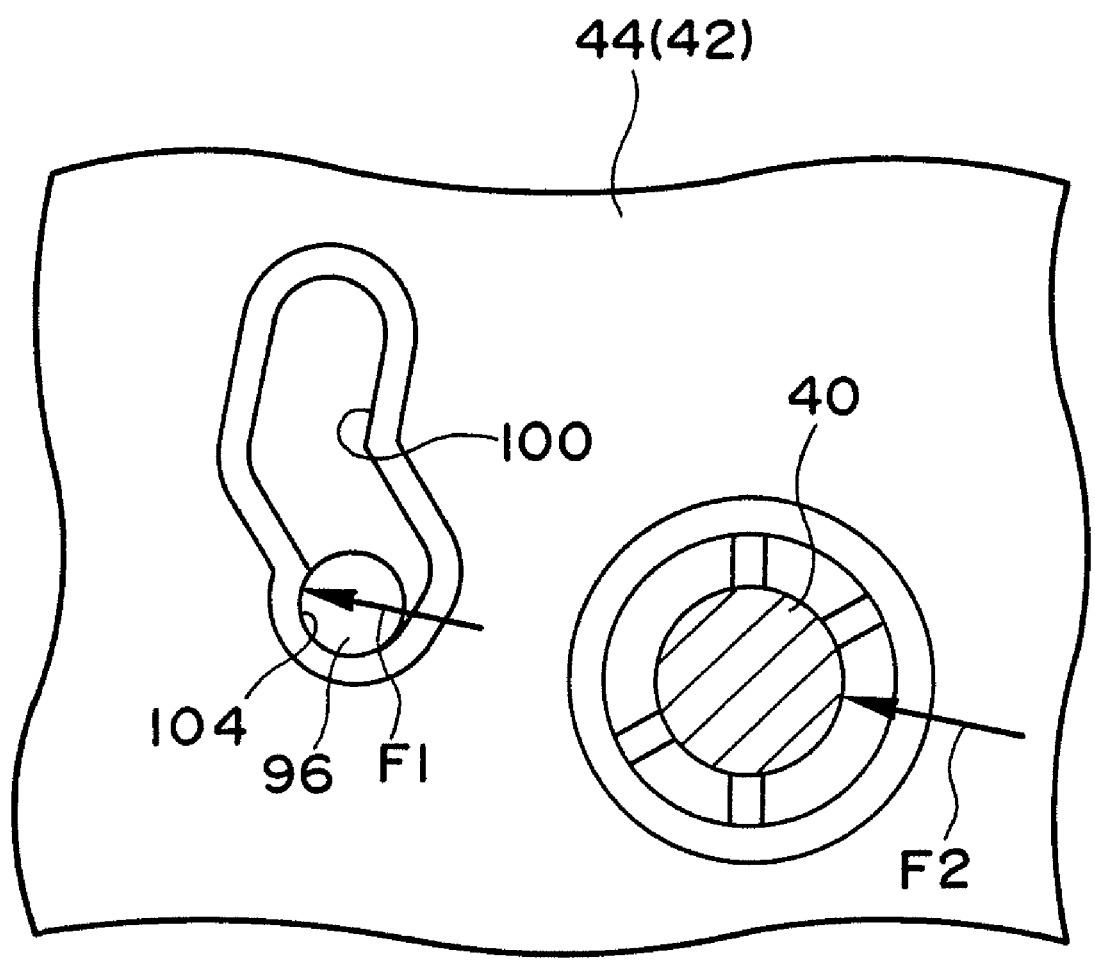
FIG. 5 is an enlarged view of a guide portion and the groove portion.

Further, groove portion 104 which constitutes a holding portion is formed continuously at one end in a longitudinal direction of guide groove 100 as a pressure receiving portion. Similarly to guide groove 100, groove portion 104 is formed as a groove inside of which guide pin 96 can be inserted and, as shown in FIG. 3, guide pin 96 is positioned inside groove portion 104 in an initial state before lock plate 86 moves toward the outer side of main body portion 74. As shown in FIG. 5, groove portion 104 is formed so as to bend with respect to the longitudinal direction at one end side in a longitudinal direction of groove guide 100, and the inner width direction of groove portion 104 is aligned with the direction of a centrifugal force acting on guide pin 96 when lock base 70 rotates; namely, with the outer direction in a radial direction of the rotation of lock base 70.

Action and Effects of the First Embodiment

In the following, the action and effects of the first embodiment are explained.

In the present webbing retractor device 10, webbing belt 22, which is wound up and stored at main body 21 of spool 20, is pulled out and fitted around the body of a passenger. When webbing belt 22 is in a fitted state and the vehicle enters a state of rapid deceleration, when the state of rapid deceleration of the vehicle is detected by an acceleration sensor, an engagement portion constituting a part of the acceleration sensor engages with V-gear 42. As a result, rotation of V-gear 42 in the pull-out direction is restricted. However, when the vehicle enters a state of rapid deceleration as described above, the body of the passenger, which attempts to move in a substantially forward direction of the vehicle due to inertia, strains against webbing belt 22 so as to urge main body 21 of spool 20 to rapidly rotate in the pull-out direction.

When main body 21 of spool 20 is caused to rapidly rotate in the pull-out direction in this way, V-gear 42 rapidly rotates in the pull-out direction together with main body 21 of spool 20. While a pawl provided at main body 44 of V-gear 42 basically rotates together with V-gear 42, when V-gear 42 rapidly rotates in the pull-out direction, the pawl provided at main body 44 attempts to remain in the same place due to inertia attributable to its own mass and, as a result, delayed rotation with respect to V-gear 42 occurs at the pawl. The pawl at which delayed rotation has thus occurred swings in the retraction direction relatively with respect to V-gear 42 and, as a result, the leading end of the pawl engages with ratchet tooth 48. In a state in which the pawl is thus engaged with ratchet tooth 48, rotation of V-gear 42 in the pull-out direction is restricted.

In a state in which rotation of V-gear 42 in the pull-out direction is restricted as above, but main body 21 of spool 20 further attempts to rotate in the pull-out direction, guide pin 96 of lock plate 86, which attempts to rotate together with main body 21, is guided toward groove portion 104 and the other end in a longitudinal direction of guide groove 100.

As a result, lock portion 90 of lock plate 86 moves so as to project beyond the outer side of the outer circumferential portion of main body portion 74 and, in addition, when lock plate 86 moves to the extent that guide pin 96 reaches the other end in a longitudinal direction of guide groove 100, ratchet teeth 92 engage with ratchet teeth 94 of arm plate 16. When ratchet teeth 92 engage with ratchet teeth 94 of arm plate 16 in this way, rotation of lock base 70 and, consequently, of main body 21 of spool 20 in the pull-out direction is restricted, and withdrawal of webbing belt 22 from main body 21 of spool 20 is restricted. When withdrawal of webbing belt 22 from main body 21 of spool 20 is restricted, webbing belt 22 restricts inertial movement of the passenger body in the substantially forward direction of the vehicle.

Further, when webbing belt 22 is released from a state in which it is mounted with respect to a passenger's body, main body 21 rotates in the retraction direction due to the biasing force of a flat spiral spring and, as a result, webbing belt 22 is retracted and stored at main body 21 of spool 20. However, since lock base 70 also rotates in the retraction direction when main body 21 of spool 20 rotates in the retraction direction, a centrifugal force acts on lock plate 86. As a result, guide pin 96 of lock plate 86 pushes against an inner wall of groove portion 104, in the same direction as the centrifugal force, with pressing force F1 and, consequently, V-gear 42 attempts to move in the direction of the action of pressing force F1.

When V-gear 42 attempts to move in the direction of the action of pressing force F1, V-gear 42 pushes against shaft portion 40 of torsion shaft 26, which passes through the center of V-gear 42, with pressing force F2 in the same direction as pressing force F1, and V-gear 42 press-contacts against shaft portion 40. As a result, friction between the inner circumferential portion of V-gear 42 and the outer circumferential portion of shaft portion 40 increases and, as a result of the increased friction, rotation of V-gear 42 relative to shaft portion 40, in other words, rotation of V-gear 42 relative to spool 20, is suppressed.

In addition, as described above, guide pin 96 of lock plate 86 pushes against the inner wall of groove portion 104 with pressing force F1. As a result, friction between the outer circumferential portion of guide pin 96 and the inner wall of groove portion 104 increases and, as a result of the increased friction, V-gear 42 is held by guide pin 96 and rotation of V-gear 42 relative to spool 20 is suppressed.

Further, in the present embodiment, the part of the inner wall of groove portion 104 that is opposed to guide pin 96 along the direction of action of the above-described centrifugal force faces the opposite direction to the direction of the centrifugal force. As a result, even when pressing force F1 is applied from guide pin 96 to the inner wall of groove portion 104 in the same direction as the centrifugal force, guide pin 96 does not push against the inner wall of groove portion 104 in a direction inclined toward the side of the retraction direction with respect to the direction of the centrifugal force.

As a result, V-gear 42 does not rotate in the retraction direction ahead of lock base 70 (in other words, a phase difference between V-gear 42 and lock base 70 in the retraction direction is not generated). Consequently, rotation of V-gear 42 relative to spool 20 in the retraction direction is yet further suppressed.

As above, in the present embodiment, in a state in which main body 21 of spool 20 rotates in the retraction direction and retracts webbing belt 22, since rotation of V-gear 42 relative to main body 21 in the retraction direction is either prevented or extremely effectively suppressed, even if main body 21 of spool 20 rotates sharply, albeit to a minor degree, in the pull-out direction due to a reverse action immediately after main body 21 finishes retracting webbing belt 22, lock plate 86 does not move until guide pin 96 reaches the other end portion in a longitudinal direction of guide groove 100 and the occurrence of end-lock, whereby ratchet teeth 92 engage with ratchet teeth 94 when main body 21 finishes retraction of webbing belt 22, can effectively be prevented.

Further, in the present embodiment, according to which the occurrence of end-lock can effectively be prevented as above, in contrast to conventional structures it is sufficient simply to form groove portion 104, and the cost of achieving the effect of prevention of end-lock as above is not high.

Second Embodiment

Next, other embodiments of the present invention are explained. Further, in the following explanations of the respective embodiments, portions of the embodiment that is being explained that are substantially identical to previously explained embodiments including the first embodiment are given identical reference numbers and detailed explanation thereof is omitted.

Figure 6:
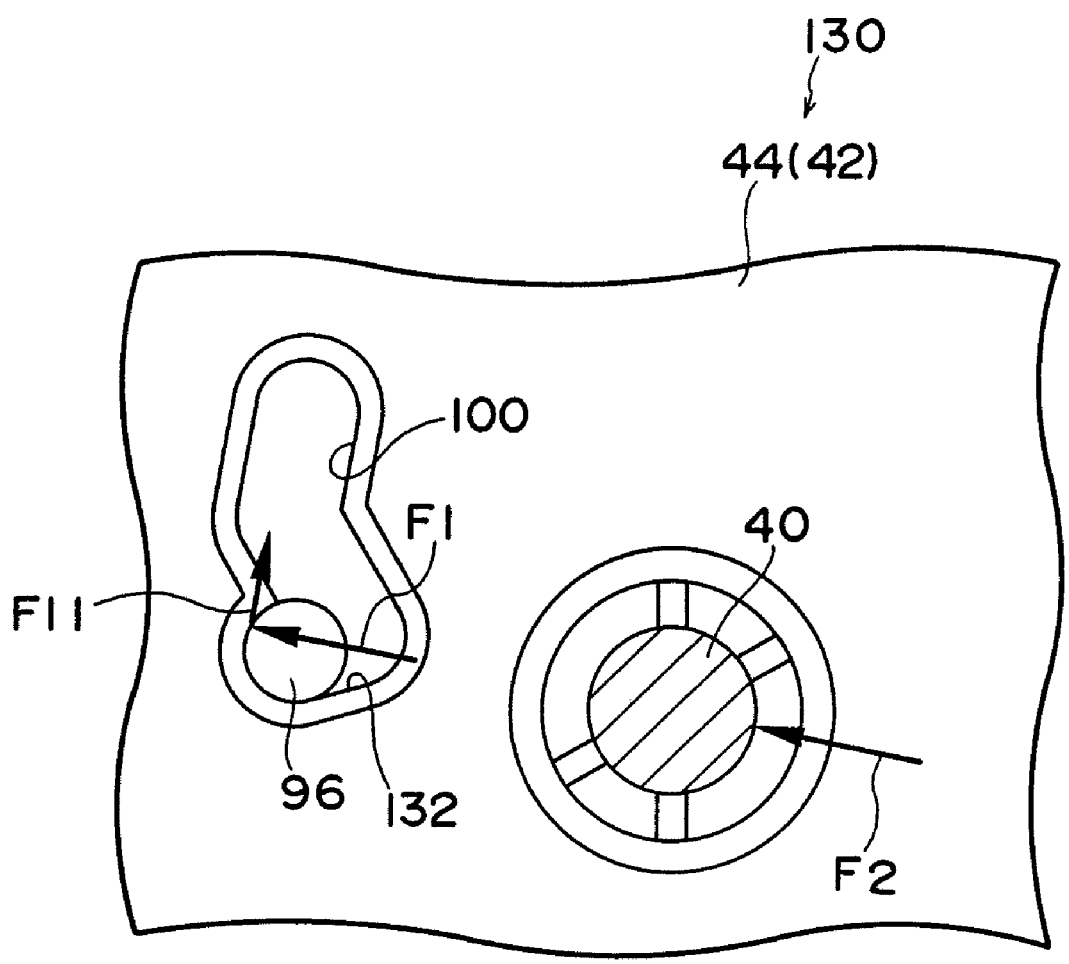
FIG. 6 is a diagram corresponding to FIG. 5, and showing the configuration of the main components of a webbing retractor device according to a second embodiment of the present invention.

In FIG. 6, the configuration of the main components of webbing retractor device 130 according to the present embodiment is shown in a drawing that corresponds to FIG. 5. As shown in this drawing, in the present webbing retractor device 130, groove portion 104 is not formed at one end side in a longitudinal direction of guide groove 100 and, rather, groove portion 132, which is a holding portion, is formed as a pressure receiving portion. Similarly to groove portion 104 in the first embodiment, groove portion 132 is also formed continuously at one end portion in a longitudinal direction of guide groove 100, and in an initial state before lock plate 86 moves toward the outer side of main body portion 74, guide pin 96 is positioned at an inner side of groove portion 132.

However, the part of the inner wall of groove portion 132 to which guide pin 96 positioned at the inner side of groove portion 132 imparts the above-described pressing force F1, faces a direction inclined toward the retraction direction side with respect to the direction opposite to the direction of pressing force F1 (i.e., with respect to the direction of the centrifugal force). Accordingly, when the inner wall of groove portion 132 receives pressing force F1, part of pressing force F1 is directed in the pull-out direction (that is to say, pressing force F1 as received by the inner wall of groove portion 132 has a pull-out direction component F11).

In other words, in the present embodiment, rotation of V-gear 42 in the pull-out direction is either prevented or is extremely effectively suppressed by pull-out direction component F11 of pressing force F1. As a result, even if main body 21 of spool 20 rotates sharply, albeit to a minor degree, in the pull-out direction due to a reverse action immediately after main body 21 finishes retracting webbing belt 22, lock plate 86 does not move until guide pin 96 reaches the other end portion in a longitudinal direction of guide groove 100 and the occurrence of end-lock, whereby ratchet teeth 92 engage with ratchet teeth 94 when main body 21 finishes retraction of webbing belt 22, can be prevented yet more effectively.

What is claimed is:

1. A webbing retractor device, comprising:
    a spool that winds up a long belt-shaped webbing belt from an anchor end side thereof by rotating around its own axis in one direction which is a retraction direction;
    a rotating body that is axially supported at the spool so as to be able to follow the rotation of the spool, in a state in which it is relatively rotatable to a predetermined angle with respect to the spool;
    a lock member provided at the spool in a state of engagement with the rotating body;
    a projection formed to project from a main body portion of the lock member toward the rotating body;
    a guide portion formed at the rotating body so as to allow insertion of the projection thereinside, an inner wall of which guides the projection when the spool rotates in the pull-out direction relative to the rotating body, and which causes the lock member to be displaced in a direction of locking of the spool, wherein
    a holding portion is formed at the rotating body so as to allow insertion of the projection thereinside, the holding portion being continuous and aligned with the guide portion so as to allow reciprocal movement of the projection between the holding portion and the guide portion, and wherein
    an inner wall of the holding portion, which receives a pressing force derived from centrifugal force from the projection, faces the inner direction in the radial direction of the rotation of the spool or a direction inclined toward the retraction direction with respect to the inner direction in the radial direction of the rotation of the spool so as to prevent movement of the projection along the inner wall of the guide portion when the spool rotates in a retraction direction.

2. The webbing retractor device of claim 1, wherein the guide portion is a guide groove bent between one and the other end in a longitudinal direction in a substantial V-shape around an axis that is parallel with respect to an axial direction of the spool.

3. The webbing retractor device of claim 2, wherein the holding portion is a groove portion formed continuously at one end in a longitudinal direction of the guide groove.

4. The webbing retractor device of claim 1, wherein the guide portion is a guide groove having first and second opposing parallel walls that are bent between one and the other end in a longitudinal direction in a substantial V-shape, the first opposing wall of the guide groove corresponding to the inner wall of the guide portion which guides the projection when the spool rotates in the pull-out direction relative to the rotating body, and the holding portion forming an enlarged end of guide groove, and the inner wall of the holding portion intersecting at an angle the second opposing wall of the guide groove, the vertex formed by said angular intersection preventing movement of the projection from the holding portion to the groove when the spool rotates in a retraction direction.

\* \* \* \* \*